UNITED STATES PATENT OFFICE.

CLARENCE J. BROCKBANK, OF NIAGARA FALLS CENTRE, ONTARIO, CANADA, ASSIGNOR TO THE CARBORUNDUM COMPANY, OF NIAGARA FALLS, NEW YORK, A CORPORATION OF PENNSYLVANIA.

PROCESS FOR PURIFYING SILICON.

1,180,968.   Specification of Letters Patent.   Patented Apr. 25, 1916.

No Drawing.   Application filed September 18, 1912.   Serial No. 720,957.

*To all whom it may concern:*

Be it known that I, CLARENCE J. BROCKBANK, a subject of the King of Great Britain, and residing at Niagara Falls Centre, Ontario, Canada, have invented a new and useful Process for Purifying Silicon, of which the following is a specification.

This invention is more particularly applied to the purification of molten silicon intended to be cast into various forms for use as acid-resisting vessels and other purposes, where the properties of great resistance to chemical attack, high mechanical strength and freedom from porosity and gaseous occlusions are desirable.

The present process is simple and inexpensive. It protects the silicon against oxidation during the re-melting, and provides a solvent for the silicon dioxid originally present as an objectionable impurity in the silicon.

Silicon metal as produced industrially in the electric furnace contains impurities such as iron, aluminum, calcium and their compounds, carbon, silicon dioxid and occluded gases. In this form the metal has a very coarse crystalline structure and is porous; consequently it is very brittle and its mechanical strength is low. Remelting and casting the material does not improve it in these respects, but on the contrary, tends to make it more porous due to oxidation. While silicon is not readily oxidized at a red heat, nevertheless at a white heat, or when fused, it is easily oxidized in contact with the air, and is quickly coated with a layer of white oxid. In the casting of silicon, this not only means great loss but also porosity, lack of homogeneity and poor mechanical properties.

According to my invention, the elimination of impurities and prevention of oxidation is effected by melting the silicon in a crucible furnace, or any other suitable furnace, under a layer of slag, which preferably may be a natural or artificial silicate, and which for convenience, may be ordinary broken window glass. The glass melts before the silicon and flows over the surface, forming a layer which effectually protects the metal underneath from oxidation. The purification then goes on rapidly and is very complete in about three hours, the glass at the end of the run remaining as a dark slag. Metal so treated is, when cast, characterized by a dense and fine crystalline structure, by perfect freedom from blowholes, and by considerable mechanical strength. An actual example of the results obtained is shown by the following analysis in which column I is the composition of the silicon before purification, and column II is the composition after melting under silicate.

|          | I.     | II.    |
|----------|--------|--------|
| Silicon  | 92.05% | 97.47% |
| Iron     | 4.45   | 1.20   |
| Aluminum | 1.80   | .33    |

Purification may be carried further by prolonging the period of heating.

The method is applicable not only to silicon but also to silicon alloys and compounds, for example, to high percentage ferro-silicon. There follows the same marked improvement in physical structure and mechanical strength and a considerable diminution in the content of the various impurities present in the alloy. By the term silicon (as used herein and in the claims) I therefore mean not only commercial metallic silicon containing 90% and upward of silicon, but also any alloy or compound in which silicon forms the principal constituent.

Various methods may be employed in adding the silicate. It may be intimately mixed with the silicon before fusing or it may be added in a molten state. It may also be removed during the process and a fresh layer added. I have also employed other slags not containing silica, for example slags of fluorspar and have found that a certain elimination of impurities is likewise obtained, although I prefer to use slags of the silicate group.

I claim:

1. The method of removing impurities from silicon, which consists in melting the silicon under a layer of a fused slag adapted to unite with said impurities.

2. The method of removing impurities from silicon, which consists in melting the silicon under a layer of a fused silicate.

3. The method of removing impurities from silicon, which consists in melting the silicon under a fused layer of a double silicate of calcium and an alkali metal.

In testimony whereof, I have hereunto set my hand.

CLARENCE J. BROCKBANK.

Witnesses:
 EDMUND S. SMITH,
 J. ROY LINCOLN.